(12) United States Patent
Ono et al.

(10) Patent No.: US 12,501,721 B2
(45) Date of Patent: Dec. 16, 2025

(54) SEMICONDUCTOR DEVICE

(71) Applicant: NTT, Inc., Tokyo (JP)

(72) Inventors: Yoko Ono, Musashino (JP); Yuya Uzumaki, Musashino (JP); Sayumi Sato, Musashino (JP); Takeshi Komatsu, Musashino (JP)

(73) Assignee: NTT, Inc., Tokyo (JP)

( * ) Notice: Subject to any disclaimer, the term of this patent is extended or adjusted under 35 U.S.C. 154(b) by 238 days.

(21) Appl. No.: 18/000,579

(22) PCT Filed: Jun. 5, 2020

(86) PCT No.: PCT/JP2020/022364
§ 371 (c)(1),
(2) Date: Dec. 2, 2022

(87) PCT Pub. No.: WO2021/245923
PCT Pub. Date: Dec. 9, 2021

(65) Prior Publication Data
US 2023/0215966 A1  Jul. 6, 2023

(51) Int. Cl.
*H10F 30/227* (2025.01)
*H10F 77/124* (2025.01)

(52) U.S. Cl.
CPC ....... *H10F 30/227* (2025.01); *H10F 77/1246* (2025.01)

(58) Field of Classification Search
CPC .. H01L 31/108; H01L 31/03044; B01J 35/39; B01J 21/063; B01J 23/42; B01J 23/75;
(Continued)

(56) References Cited

U.S. PATENT DOCUMENTS

| 2011/0226632 A1* | 9/2011 | Cole | C25B 1/55 205/450 |
|---|---|---|---|
| 2014/0072836 A1* | 3/2014 | Mills | H01M 14/00 429/422 |

(Continued)

FOREIGN PATENT DOCUMENTS

| JP | 2010-247109 A | 11/2010 |
|---|---|---|
| JP | 2016-43304 A | 4/2016 |

(Continued)

OTHER PUBLICATIONS

Cunyu Zhao et al., *Ultrasonic Spray Pyrolysis Synthesis of $Ag/TiO_2$ Nanocomposite Photocatalysts for Simultaneous $H_2$ Production and $CO_2$ Reduction*, International Journal of Hydrogen Energy, vol. 37, 2012, pp. 9967-9976.

(Continued)

*Primary Examiner* — Bitew A Dinke
(74) *Attorney, Agent, or Firm* — Workman Nydegger

(57) ABSTRACT

A semiconductor device includes a semiconductor layer, which is disposed on the surface of a substrate and causing an oxidation reaction and a reduction reaction when irradiated with light, an oxidation catalyst layer, which is disposed on part of the surface of the semiconductor layer, forms along with the semiconductor layer a Schottky junction, and oxidizes an oxidation target substance, a reduction catalyst layer, which is disposed on part of the surface of the semiconductor layer where the oxidation catalyst layer is not disposed so as to be separated from the oxidation catalyst layer, forms along with the semiconductor layer an ohmic junction, and reduces a reduction target substance, and an insulation layer, which is disposed on the entirety of the surface of the semiconductor layer where none of the oxidation catalyst layer and the reduction catalyst layer is
(Continued)

disposed so as to be in contact with the oxidation catalyst layer and the reduction catalyst layer.

7 Claims, 7 Drawing Sheets

(58) Field of Classification Search
CPC .......... C01B 32/40; C01B 32/50; C01B 3/042; H10F 30/227; H10F 77/1246
See application file for complete search history.

(56) References Cited

U.S. PATENT DOCUMENTS

| | | | | |
|---|---|---|---|---|
| 2014/0170511 | A1* | 6/2014 | Tolmachev | H01M 8/0656 429/418 |
| 2015/0252483 | A1* | 9/2015 | Ono | C25B 3/25 204/252 |
| 2016/0086738 | A1* | 3/2016 | Takayasu | H01G 9/2022 438/85 |
| 2016/0315446 | A1* | 10/2016 | Taeger | H01S 5/0234 |
| 2016/0376717 | A1* | 12/2016 | Tamura | C25B 11/095 204/252 |
| 2017/0002471 | A1* | 1/2017 | Okamoto | C25B 9/73 |
| 2017/0130342 | A1* | 5/2017 | Ono | C25B 11/031 |
| 2017/0179558 | A1* | 6/2017 | Mckone | H01M 8/188 |
| 2018/0216243 | A1* | 8/2018 | Kudo | C25B 9/73 |
| 2020/0002822 | A1* | 1/2020 | Ono | C25B 9/00 |

FOREIGN PATENT DOCUMENTS

| | | |
|---|---|---|
| JP | 2017-121598 A | 7/2017 |
| JP | 2017121597 A * | 7/2017 |
| JP | 2018-90863 A | 6/2018 |

OTHER PUBLICATIONS

Muhammad Tahir et al., *Photocatalytic $CO_2$ Reduction and Kinetic Study Over In/$TiO_2$ Nanoparticles Supported Microchannel Monolith Photoreactor*, Applied Catalysis A: General, vol. 467, 2013, pp. 483-496.

Satoshi Yotsuhashi et al., *$CO_2$ Conversion with Light and Water by GaN Photoelectrode*, Japanese Journal of Applied Physics, vol. 51, 2012, pp. 02BP07-1-02BP07-3.

* cited by examiner

SEMICONDUCTOR DEVICE

TECHNICAL FIELD

The present invention relates to a semiconductor device.

BACKGROUND ART

There has been a known photocatalyst that exhibits a catalytic function by light radiation to cause a chemical reaction with an oxidation target substance or a reduction target substance. For example, the photocatalyst uses sunlight to carry out an oxidation reaction that produces hydrogen from water without production of carbon dioxide and further carry out a reduction reaction that produces carbon monoxide, formic acid, methanol, methane, and other substances from carbon dioxide. The produced carbon monoxide and other substance can be used as recycled energy.

To improve the quantum yield in the photocatalytic reaction using the photocatalyst, it is necessary to set up an oxidation reaction site that facilitates the oxidation reaction and a reduction reaction site that facilitates the reduction reaction in such a way that the reverse reaction of a reaction intermediate or product can be suppressed, spatially separate the electron-hole pairs photo-excited in the photocatalyst from each other, move the spatially separated holes to the oxidation reaction site, and move the spatially separated electrons to the reduction reaction site.

To this end, it is conceivable to employ a method for facilitating the hydrogen production reaction by causing the surface of titanium oxide particles, which are a photocatalyst, to carry metal fine particles (see Non-Patent Literatures 1 and 2). In Non-Patent Literature 1, a nanoparticle mixture produced by coating the entire surface of each of the titanium oxide fine particles with silver nanoparticles is used to enable production of hydrogen based on water reduction in the vicinity of the silver nanoparticles. However, the oxidation site where oxygen is produced by water decomposition that occurs at the surfaces of titanium oxide fine particles is not controlled, and oxygen is produced in the extreme vicinity of the reduction site where hydrogen is produced. The spatial separation of the electron-hole pairs in the photocatalyst is also not controlled. Hydrogen and oxygen are therefore undesirably produced in the extreme proximity to each other, and it is difficult to prevent the reverse reaction.

In Non-Patent Literature 2, the photoreduction of carbon dioxide is achieved in the vicinity of indium fine particles by causing the surfaces of titanium oxide fine particles to carry the indium fine particles. However, the quantum yield is 0.022%, which is an extremely low yield. The reason for this is that after carbon dioxide is reduced by a single electron into $CO_2^-$, the reaction field is not controlled, and the reverse reaction using multiple intermediates occurs.

Therefore, to suppress the reverse reaction of a reaction intermediate or product, it is necessary to control the arrangement of both the oxidation and reduction reaction sites. For example, in Non-Patent Literature 3, to improve the efficiency of the carbon dioxide reduction reaction, the carbon dioxide reduction reaction site and the water oxidation reaction site are provided in a separated manner, which are formed of, respectively, a metal (Cu) cathode plate and an anode plate including a photocatalyst (GaN) having a surface to which a catalytic promoter (NiO) is added. Non-Patent Literature 3 proposes a method for electrically connecting the anode and cathode plates to each other, radiating light (UV) to the oxidation reaction site to spatially separate electrons ($e^-$) in the photocatalyst, and causing the spatially separated electrons to flow to the reduction reaction site. The anode and cathode plates are immersed in an electrolyte and separated from each other by an ion exchange membrane (SEM) to suppress the reverse reaction.

CITATION LIST

Non-Patent Literature

Non-Patent Literature 1: Cunyu Zhao, 4 et al., "Ultrasonic spray pyrolysis synthesis of Ag/TiO2 nanocomposite photocatalysts for simultaneous H2 production and CO2 reduction", International Journal of Hydrogen Energy 37, 2012, p. 9967-p. 9976

Non-Patent Literature 2: Muhammad Tahir, 2 et al., "Photocatalytic CO2 reduction and kinetic study over In/TiO2 nanoparticles supported microchannel monolith photoreactor", Applied Catalysis A: General 467, 2013, p. 483-p. 496

Non-Patent Literature 3: Satoshi Yotsuhashi, 6 et al., "CO2 Conversion with Light and Water by GaN Photoelectrode", Japanese Journal of Applied Physics 51, 2012, p. 02BP07-1-p. 02BP07-3

SUMMARY OF THE INVENTION

Technical Problem

In the photoelectrochemical reaction system disclosed in Non-Patent Literature 3, however, the electrons and holes produced by light radiation along with the photocatalyst are efficiently separated from each other, while the holes accumulate on the anode plate, which is an oxidation reaction site and is generally considered to have high reaction resistance, so that not only the target reaction but an auto-oxidation reaction (corrosion reaction) of the anode progresses as a side reaction. Furthermore, the system in which the separation is made by the ion exchange membrane described above is effective in performing redox reactions in solution systems but is not applicable to systems that cause gaseous reaction target substance to react by solid electrodes.

The present invention has been made in view of the circumstances described above, and an object of the present invention is to provide a technology that allows improvement in the quantum yield of photocatalytic reactions in photocatalysts.

Means for Solving the Problem

A semiconductor device according to an aspect of the present invention includes a semiconductor layer disposed on a surface of a substrate and causing an oxidation reaction and a reduction reaction when irradiated with light, an oxidation catalyst layer that is disposed on part of a surface of the semiconductor layer, forms along with the semiconductor layer a Schottky junction, and oxidizes an oxidation target substance, a reduction catalyst that is disposed on part of the surface of the semiconductor layer where the oxidation catalyst layer is not disposed so as to be separated from the oxidation catalyst layer, forms along with the semiconductor layer an ohmic junction, and reduces a reduction target substance, and an insulation layer that is disposed on entirety of the surface of the semiconductor layer where none of the oxidation catalyst layer and the reduction catalyst layer is disposed so as to be in contact with the oxidation catalyst layer and the reduction catalyst layer, and transmits the light with which the semiconductor layer is irradiated, and the surface of the semiconductor layer is entirely coated with the oxidation catalyst layer, the reduction catalyst layer, and the insulation layer.

Effects of the Invention

According to the present invention, a technology that allows improvement in the quantum yield of photocatalytic reactions in photocatalysts can be provided.

DESCRIPTION OF EMBODIMENTS

Figure 1:
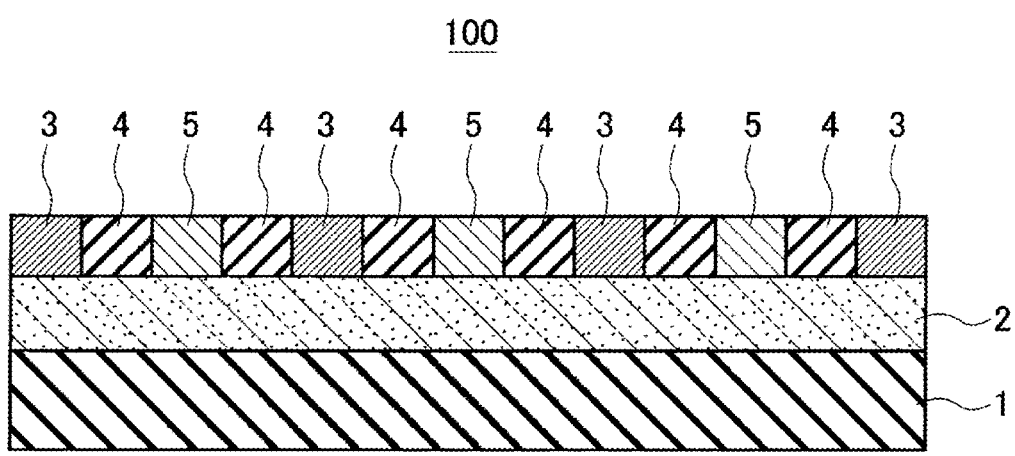
FIG. 1 is a cross-sectional view showing a cross section of a semiconductor device according to Example 1.

An embodiment of the present invention will be described below with reference to the drawings. The present invention is not limited to the present embodiment, and changes may be made without departing from the spirit of the present invention.

SUMMARY OF THE INVENTION

The present invention relates to the technology for a highly durable semiconductor device that efficiently causes a chemical reaction (oxidation or reduction reaction) of an oxidation target substance or reduction target substance by using a semiconductor having a photocatalytic function activated by light, particularly, sunlight. Examples of the semiconductor device may include a semiconductor device that uses the sunlight energy to reduce carbon dioxide into carbon monoxide, formic acid, methanol, methane, or any other substance, and a semiconductor device that performs water photolysis to produce hydrogen.

In the present invention, to improve the quantum yield of a photocatalytic reaction, the surface of a semiconductor layer that is a photocatalyst is caused to carry an oxidation catalyst layer that is a catalytic material for causing an oxidation reaction in such a way that the oxidation catalyst layer and the semiconductor layer form a Schottky junction. In the configuration described above, an electric field that attracts holes toward the junction region, where the oxidation catalyst layer and the semiconductor layer are joined to each other, is formed in the semiconductor layer, therefore facilitates spatial separation of photo-excited electron-hole pairs in the semiconductor layer, and further facilitates movement of the holes to an oxidation reaction site that facilitates the oxidation reaction. As a result, the quantum yield of the photocatalytic reaction in the semiconductor layer can be improved.

Furthermore, in the present invention, the same surface of the semiconductor layer is caused to carry a reduction catalyst layer that is a catalytic material for causing a reduction reaction in such a way that the reduction catalyst layer and the semiconductor layer form an ohmic junction. In the configuration described above, an electric field that attracts electrons toward the junction region, where the reduction catalyst layer and the semiconductor layer are joined to each other, is also formed in the semiconductor layer and therefore facilitates movement of the electrons to a reduction reaction site that facilitates the reduction reaction. As a result, the quantum efficiency of the photocatalytic reaction in the semiconductor layer can be further improved.

In the configuration described above, a deterioration reaction (auto-oxidation reaction) progresses at the exposed surface of the semiconductor layer, the surface that carries no oxidation catalyst layer and reduction catalyst layer, so that the redox reaction cannot progress efficiently. In the present invention, an insulation layer capable of transmitting light in the wavelength range absorbed by the semiconductor layer is formed in the exposed region of the semiconductor layer, the surface that carries no oxidation catalyst layer and reduction catalyst layer. A structure in which the entire surface of the semiconductor layer is coated is thus achieved, whereby the deterioration reaction that progresses at the surface of the semiconductor layer can be suppressed without hindering the light absorption performed by the semiconductor layer, whereby the redox reaction is allowed to occur efficiently. As a result, the quantum efficiency of the photocatalytic reaction in the semiconductor layer can be further improved.

Example 1

Configuration of Semiconductor Device

FIG. 1 is a cross-sectional view showing a cross section of a semiconductor device 100 according to Example 1. The semiconductor device 100 includes, for example, a substrate 1, a semiconductor layer 2, oxidation catalyst layers 3, an insulation layer 4, and reduction catalyst layers 5.

The substrate 1 is a sapphire substrate having the shape of a flat plate. The substrate 1 may be an insulating substrate, such as a glass substrate, or an electrically conductive substrate, such as a silicon (Si) substrate and a gallium nitride (GaN) substrate.

The semiconductor layer 2 is formed of a photocatalyst that is disposed on one surface of the substrate 1 and exhibits a catalytic function by light radiation to cause a chemical reaction with an oxidation target substance or reduction target substance. Specifically, the semiconductor layer 2 is a semiconductor thin film in which electron-hole pairs are spatially separated into electrons and holes when irradiated with light to cause an oxidation reaction by using the spatially separated holes and a reduction reaction by using the spatially separated electrons. In the present example, the semiconductor layer 2 is made of a gallium nitride (GaN), which is a nitride semiconductor. The semiconductor layer 2 may instead be made of a metal oxide, such as titanium oxide ($TiO_2$), tungsten oxide ($WO_3$), and gallium oxide ($Ga_2O_3$) having a photocatalytic function. The semiconductor layer 2 may still instead be made of a compound semiconductor, such as cadmium sulfide (CdS). When gallium nitride (GaN) is used, n-type gallium nitride (n-GaN) may be used in the form of a single layer, or a semiconductor material (aluminum gallium nitride (AlGaN)) having an energy level at the bottom of the conduction band greater than that of n-GaN in the negative direction may be layered on n-GaN facing the substrate 1. AlGaN/n-GaN, which facilitates electric charge separation, is more preferable as the semiconductor layer 2.

The oxidation catalyst layers 3 are an oxidation catalyst that are disposed on part of the surface of the semiconductor layer 2, are so carried that the oxidation catalyst layers 3 and the underlying semiconductor layer 2 form a Schottky junction, and oxidizes an oxidation target substance. That is, the oxidation catalyst layers 3 function as a catalyst promoter of a photocatalyst that collects holes photo-excited in the semiconductor layer 2 and performs an oxidation reaction. In the present embodiment, the oxidation catalyst layers 3 are made of nickel oxide (NiO). The oxidation catalyst layers 3 may instead be made of a metal oxide produced by forming a metal that can be oxidized later, such as titanium (Ti) and cobalt (Co), and then performs a heat treatment on the formed metal. The oxidation catalyst layers 3 may be formed, for example, by directly depositing cobalt oxide (CoO), tricobalt tetraoxide ($Co_3O_4$), or titanium oxide ($TiO_2$) in sputtering or vapor deposition. The oxidation catalyst layers 3 preferably have a thickness within a range (about 1 to 5 nm, for example) that does not prevent light transmission to the semiconductor layer 2.

The insulation layer 4 is a transmissive insulator that is disposed on the entire surface of the semiconductor layer 2, the surface where the oxidation catalyst layers 3 and the reduction catalyst layers 5 are not disposed, in such a way that the insulation layer 4 is in contact with the oxidation catalyst layers 3 and the reduction catalyst layers 5, and transmits light radiated to the semiconductor layer 2. In the present example, the insulation layer 4 is made of silicon dioxide ($SiO_2$), which is an oxide. The insulation layer 4 may be an insulator made of a material that transmits light having wavelengths absorbed by the underlying semiconductor layer 2. The insulation layer 4 preferably has a thickness within a range (about 5 nm to 50 nm) that does not prevent light transmission to the semiconductor layer 2 and allows formation of a film continuous with the semiconductor layer 2. The insulation layer 4 is an insulator and has a bandgap wider than the bandgap of the semiconductor layer 2.

The reduction catalyst layers 5 are a reduction catalyst that is disposed on part of the surface of the semiconductor layer 2, the surface where the oxidation catalyst layers 3 are not disposed, in such a way that the reduction catalyst layers 5 are separated from the oxidation catalyst layers 3, and is so carried that the reduction catalyst layers 5 and the underlying semiconductor layer 2 form an ohmic junction, and reduces a reduction target substance. That is, the reduction catalyst layers 5 function as a catalyst promoter of a photocatalyst that collects electrons photo-excited in the semiconductor layer 2 and performs a reduction reaction. The reduction catalyst layers 5 may each be a single metal layer or a layer in which a plurality of metals are layered on each other. A metal that forms along with the semiconductor layer 2 the ohmic junction is formed on the side where the metal is in contact with the semiconductor layer 2, and a metal having a reduction capability is formed on the outermost surface of the resultant structure. In the present example, the reduction catalyst layers 5 are each a metal layer in which titanium (Ti) and platinum (Pt) are layered on each other sequentially from side facing the surface of the semiconductor layer 2. The reduction catalyst layers 5 may have a thickness greater than or equal to 10 nm that only needs to prevent pinholes and other unwanted features from being formed in the Ti and Pt layers and exhibit the function of the reduction catalyst layers 5.

Figure 2:
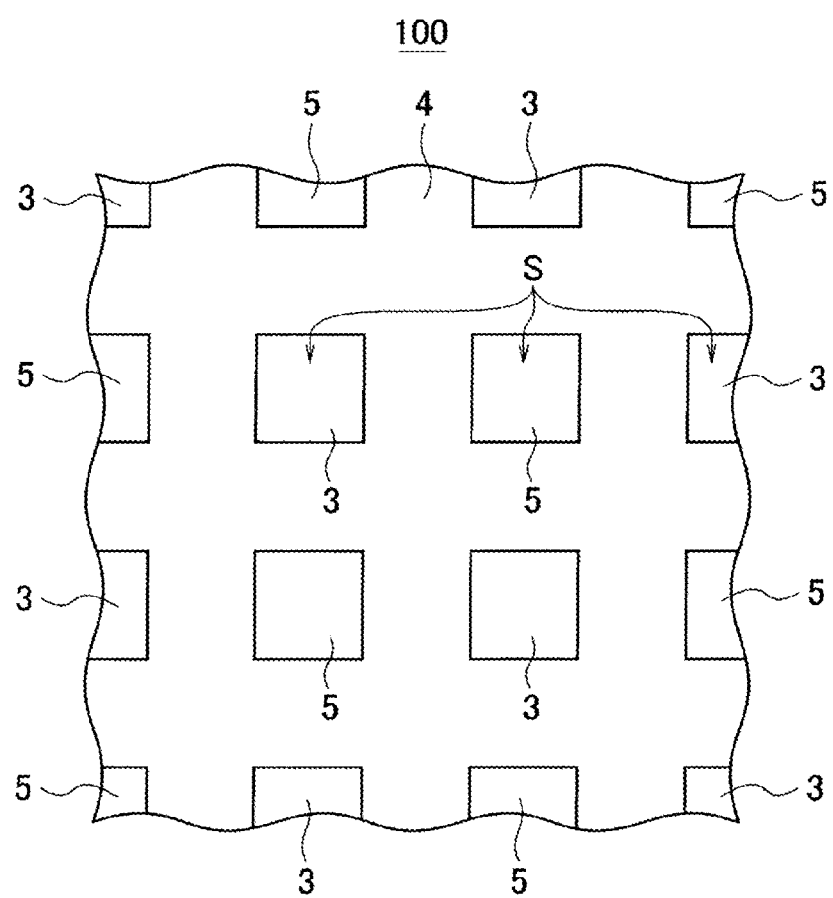
FIG. 2 is a top view showing the upper surface of the semiconductor device according to Example 1.

FIG. 2 is a top view of the semiconductor device 100 shown in FIG. 1. The entire surface of the semiconductor layer 2 (not shown) is coated with the oxidation catalyst layers 3, the insulation layer 4, and the reduction catalyst layers 5. The insulation layer 4 has the shape of a lattice in the plan view (front view in FIG. 2) of the surface of the semiconductor layer 2, and the oxidation catalyst layers 3 and the reduction catalyst layers 5 are formed on the surface of the semiconductor layer 2 alternately in a plurality of no-insulation-layer-formation regions S formed by the lattice-shaped insulation layer 4 with the no-insulation-layer-formation regions S for the oxidation catalyst layers 3 being different from the no-insulation-layer-formation regions S for the reduction catalyst layers 5. That is, the oxidation catalyst layers 3 and the reduction catalyst layers 5 are so formed as to be alternately arranged in the frontward, rearward, rightward, and leftward directions with the insulation layer 4 sandwiched between the two layers. The semiconductor device 100 shown in FIGS. 1 and 2 is presented by way of example. The same effect can be achieved as long as the oxidation catalyst layers 3 and the reduction catalyst layers 5 are arranged with the insulation layer 4 interposed therebetween so as not to be in direct contact with each other. For example, the oxidation catalyst layers 3 and the reduction catalyst layers 5 may each have, for example, a rectangular shape or a disc-like shape. The insulation layer 4 may instead have a zigzag shape.

Method for Producing Semiconductor Device

Figure 3A:
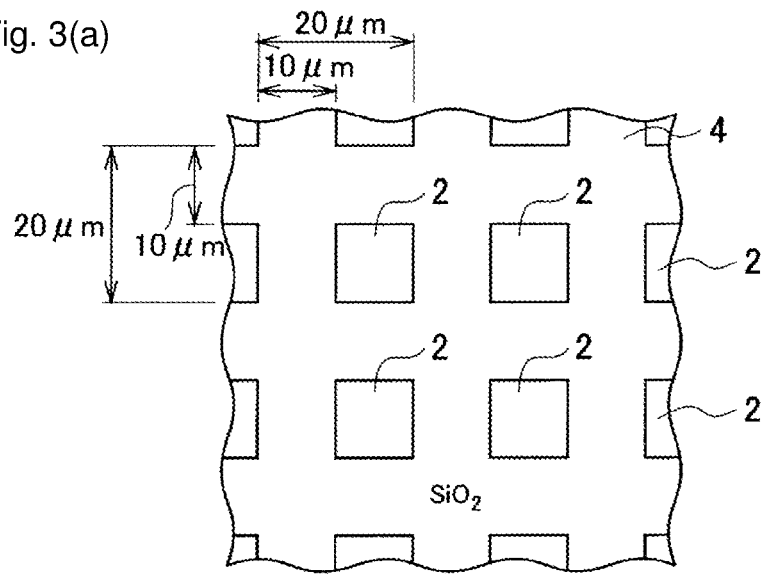
FIG. 3 is a diagram showing a method for producing the semiconductor device according to Example 1.
Figure 3B:
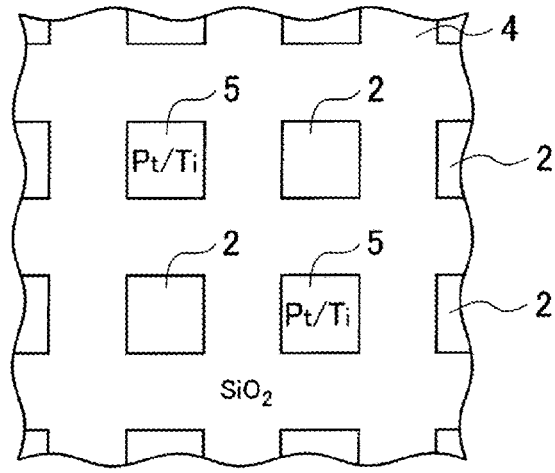
Figure 3C:
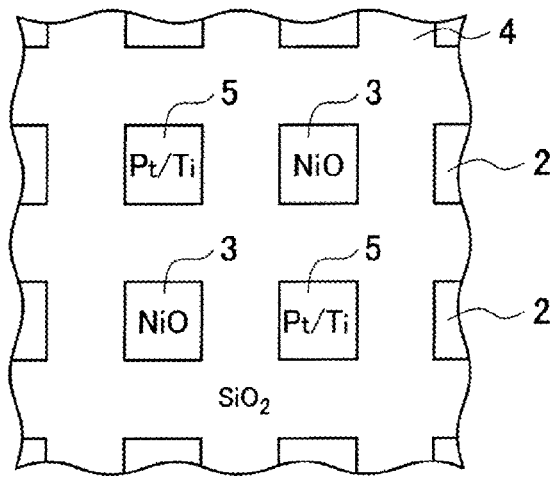

A method for producing the semiconductor device 100 will next be described. FIG. 3 is a diagram showing the method for producing the semiconductor device 100.

First Step;

A Si-doped n-GaN thin film is first epitaxially grown on the upper surface of a sapphire (0001) substrate 1 in organic metal vapor deposition. The thickness of n-GaN thin film was about 2 μm. AlGaN is subsequently grown on the upper surface of the n-GaN thin film in organic metal vapor deposition. The proportion of the Al to the entire composition was about 10% ($Al_{0.1}Ga_{0.9}N$). The AlGaN thin film has a thickness of about 100 nm. The semiconductor layer 2 formed of the AlGaN/n-GaN thin film is thus formed.

Second Step;

$SiO_2$ is then deposited on the upper surface of the AlGaN thin film (semiconductor layer 2) in sputtering to a thickness of about 50 nm. A lattice pattern having a line width of about 10 μm and an inter-adjacent-line interval of 20 μm is then formed in photolithography. The insulation layer 4 formed of a $SiO_2$ thin film having the shape of a lattice pattern is thus formed (FIG. 3(a)).

Third Step;

Ti and Pt are then layered in this order on the upper surface of the AlGaN thin film (semiconductor layer 2) in part of the no-$SiO_2$-thin-film-formation region in vacuum vapor deposition. Pt is a reduction catalyst for the reduction target substance. In this process, the Pt/Ti thin film is formed in every other region in the frontward, rearward, rightward, and leftward directions by masking every other no-$SiO_2$-thin-film-formation regions in the frontward, rearward, rightward, and leftward directions out of the plurality of no-$SiO_2$-thin-film-formation regions. In this process, sputtering may be used in place of vacuum vapor deposition. The thickness of each of the Pt thin film and the Ti thin film was about 25 nm. The resultant structure then undergoes heat treatment at about 600 degrees for about 10 minutes in a nitrogen atmosphere to form an ohmic junction of Ti and the underlying semiconductor layer 2. The reduction catalyst layers 5 each having a Pt/Ti thin film structure having a size of 10 μm×10 μm are thus formed (FIG. 3(*b*)).

Fourth Step;

Finally, Ni having a thickness of about 1 nm is formed on the upper surface of the AlGaN thin film (semiconductor layer 2) in the remainder of the no-SiO$_2$-thin-film-formation regions in vacuum vapor deposition. In this process, a Ni thin film is formed in every other regions in the frontward, rearward, rightward, and leftward directions by masking the regions of the Pt/Ti thin film (reduction catalyst layers 5). The resultant structure is then oxidized by a heat treatment at about 290 degrees for about 1 hour in the atmospheric atmosphere into NiO, and NiO and the underlying semiconductor layer 2 form a Schottky junction. As a result of analysis of a cross section of the resultant structure under a transmission microscope (TEM), the thickness of NiO was about 1.7 nm. The oxidation catalyst layers 3 each having a NiO thin film structure having a size of 10 μm×10 μm are thus formed (FIG. 3(*c*)).

The semiconductor device 100 having the structure shown in FIGS. 1 and 2 was thus formed on the surface of the semiconductor layer 2, the structure having a configuration in which the square oxidation catalyst layers 3 and the square reduction catalyst layers 5 are alternately arranged in a matrix and the spaces between the two layers are filled with a lattice-shaped insulation layer 4.

In the present example, the oxidation catalyst layers 3 and the reduction catalyst layers 5 each have a square shape having 10-μm-long edges. Instead, a disc-like shape or a polygonal shape having rounded corners, each of which has a symmetric shape, can provide the same effects as those provided in the present example. That is, a semiconductor device 100 having any shape, not limited to a square shape, and having high photocatalytic activity and capable of deterioration suppression is expected to be provided. The same effects can be expected as long as the size of each of the oxidation catalyst layers 3 and the reduction catalyst layers 5 falls within the range from about 0.5 μm to 100 μm in diameter, which is the range where electrons and holes can be produced and the electrons and holes are movable, in accordance with the light absorption characteristics and the depletion layer length of the semiconductor and further as long as the electrons and holes are not in contact with each other.

Effects and Advantages of Semiconductor Device

Figure 4:
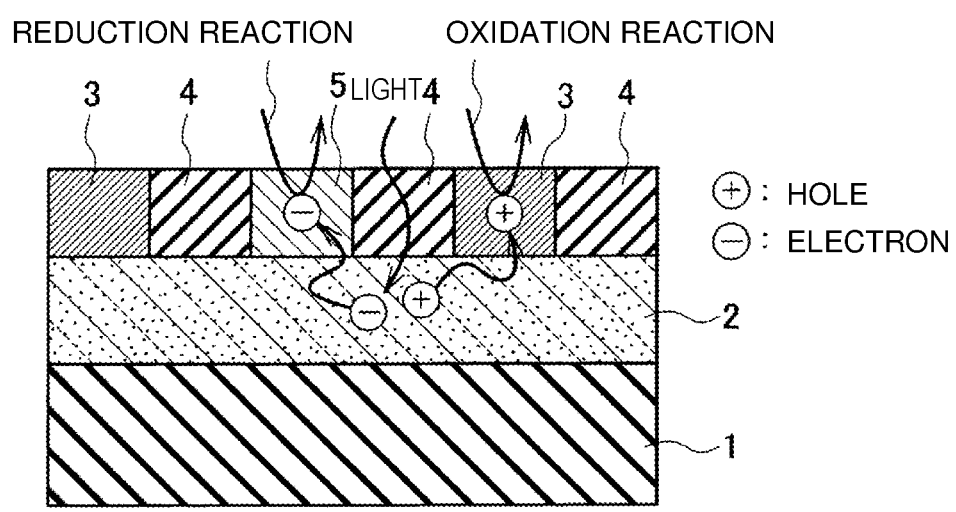
FIG. 4 is a diagram showing effects and advantages provided by the semiconductor device according to Example 1.

As described above, in the present example, in which the surface of the semiconductor layer 2 is caused to carry the oxidation catalyst layers 3, which cause an oxidation reaction, in such a way that the oxidation catalyst layers 3 and the semiconductor layer 2 form a Schottky junction, an electric field that attracts holes toward the junction region, where the oxidation catalyst layers 3 and the semiconductor layer 2 are joined to each other, is formed in the semiconductor layer 2 and facilitates spatial separation of the photoexcited electron-hole pairs in the semiconductor layer 2 and the movement of holes to the oxidation reaction site, which facilitates the oxidation reaction (FIG. 4). As a result, the quantum yield of the photocatalytic reaction in the semiconductor layer 2 can be improved.

In the present example, the same surface of the semiconductor layer 2 is caused to carry the reduction catalyst layers 5, which causes a reduction reaction, in such a way that the reduction catalyst layers 5 and the semiconductor layer 2 form an ohmic junction, so that an electric field that attracts electrons toward the junction region, where the reduction catalyst layers 5 and the semiconductor layer 2 are joined to each other, is also formed in the semiconductor layer 2 and facilitates movement of the electrons to the reduction reaction site, which facilitates the reduction reaction (FIG. 4). As a result, the quantum efficiency of the photocatalytic reaction can be further improved.

Furthermore, in the present example, the insulation layer 4, which can transmit the light in the wavelength range absorbed by the semiconductor layer 2, is formed in the exposed region of the semiconductor layer 2, the region that carries no oxidation catalyst layer 3 and reduction catalyst layer 5, so that a structure in which the entire surface of the semiconductor layer 2 is coated is achieved, whereby the deterioration reaction that progresses at the surface of the semiconductor layer 2 can be suppressed without preventing the semiconductor layer 2 from absorbing the light, and the redox reaction can efficiently occur. As a result, the quantum efficiency of the photocatalytic reaction can be still further improved.

Redox Reaction Test and Photocatalytic Activity Evaluation

A test for the redox reaction and evaluation of the photocatalytic activity in the semiconductor device will next be described.

Figure 5:
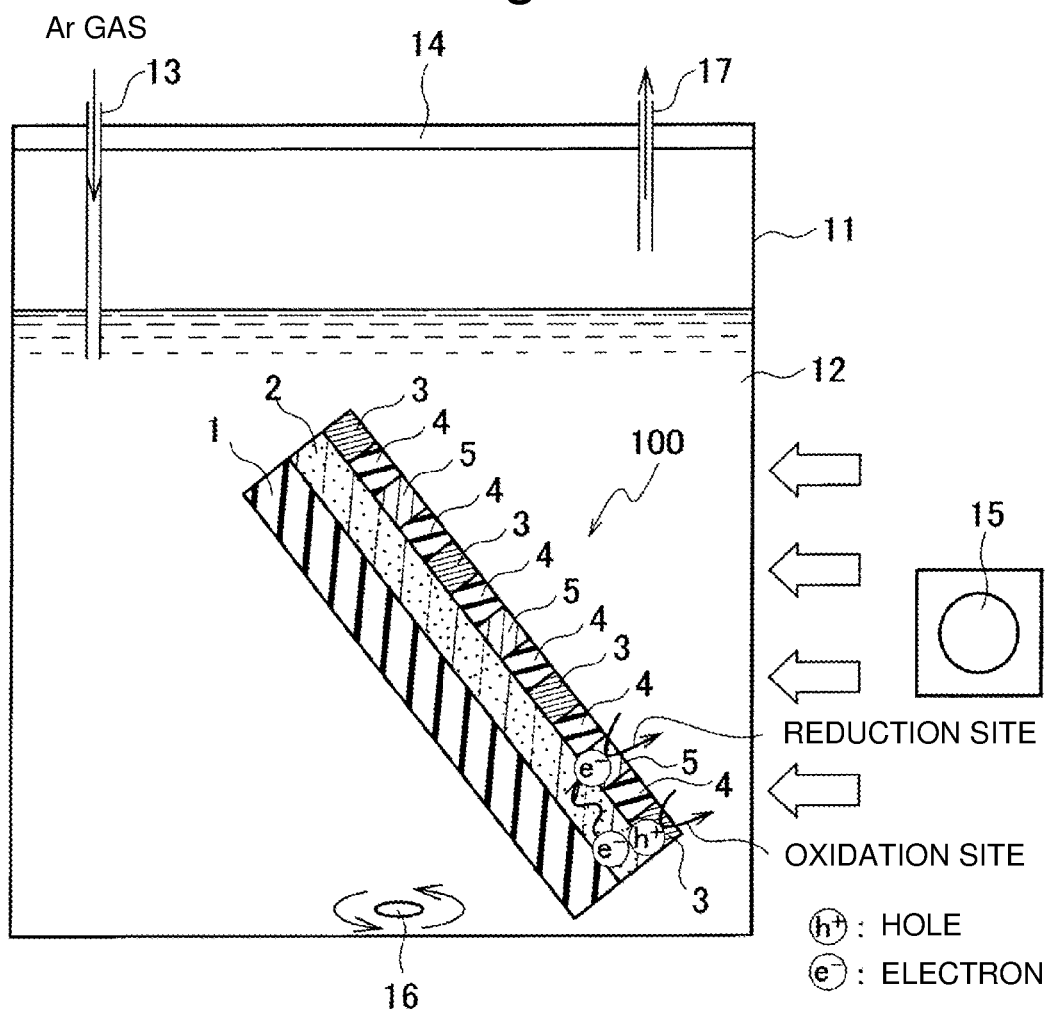
FIG. 5 is a schematic diagram showing the configuration of a redox reaction test cell according to Example 1.

FIG. 5 is a diagrammatic view showing the configuration of a redox reaction test cell according to the present example. An aqueous solution 12 placed in a reaction cell 11 was an aqueous solution of 1 M (mol) of sodium hydroxide (NaOH). The aqueous solution 12 may instead, for example, be an electrolytic solution of potassium hydroxide (KOH), sodium sulfate (Na$_2$SO$_4$), or potassium hydrogencarbonate (KHCO$_3$), or pure water.

To evaluate the photocatalytic activity, the oxidation and reduction target substances were water, and the evaluation used oxygen production by using an oxidation reaction of water and hydrogen production by using reduction of protons (H$^+$) produced by the oxidation of water. The oxidation target substance and reduction target substance are not limited to water. For example, the present invention is also applicable to production of hydrocarbons, such as carbon monoxide, formic acid, methanol, and methane, by using carbon dioxide as the reduction target substance. Furthermore, the redox reaction test method is not limited to the test in the present example, and the same effects can be provided by configuring a reaction cell that includes an electrolyte, an oxidation electrode, and a reduction electrode and allows a photoelectrochemical reaction to progress and by using sunlight as a light source.

First, 250 mL of the aqueous solution 12 containing 1 mol/L of NaOH was placed in the light transmissive reaction cell 11 having a capacity of 300 mL and a quartz window, and the semiconductor device 100 produced in accordance with the procedure described above was completely immersed in the aqueous solution 12 and fixed in an appropriate position. The semiconductor device 100 was cut into a piece having a size of 10 mm×20 mm before used. An argon gas was introduced at a flow rate of 200 mL/min via a gas inlet 13 and bubbling was performed for 10 minutes for degassing and replacement, and the reaction cell 11 was then sealed with a silicon Teflon septum 14. The pressure in the reaction cell 11 was set at the atmospheric pressure (1 atm).

A 300 W high-pressure xenon lamp (100 mW/cm$^2$) adjusted to the illuminance of sunlight was used as a light source 15 for the redox reaction, and the light was uniformly radiated from outside of the quartz window of the reaction cell 11 toward the entire surface where the semiconductor layer 2 of the semiconductor device 100 was formed. The aqueous solution 12 was agitated at the center of the bottom of the reaction cell 11 at a speed of 250 rpm by using an agitator 16, such as a rotor or a stirrer.

Figure 6:
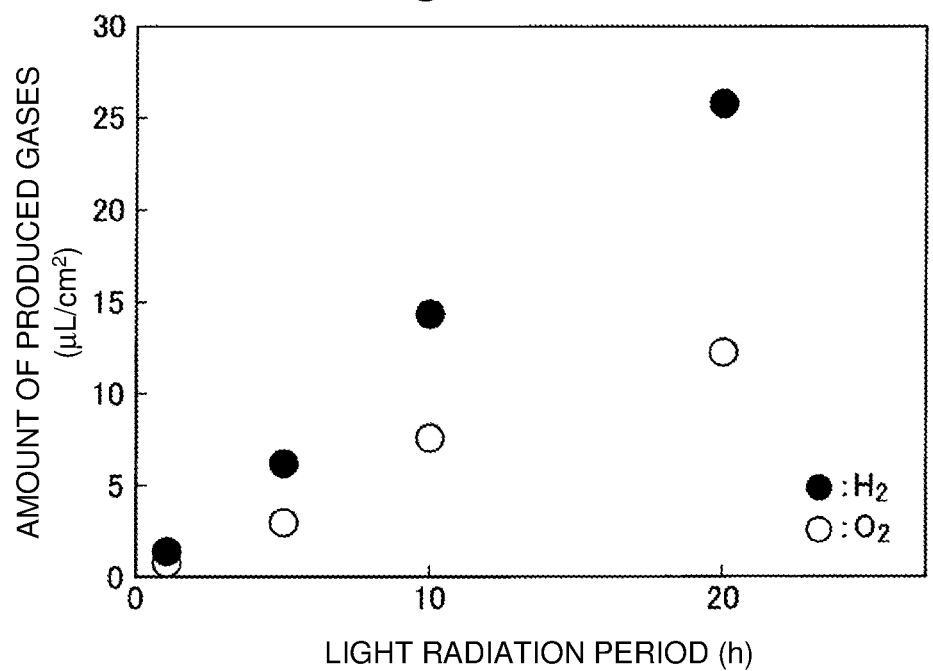
FIG. 6 is a graph showing a graph of the amount of produced gases according to Example 1.

The gas in the reaction cell 11 was collected with a syringe via a gas outlet 17 of the silicon Teflon septum 14 1 hour, 5 hours, 10 hours, and 20 hours after the light radiation, and the reaction products were analyzed by using gas chromatography. As a result, it was ascertained that hydrogen and oxygen were produced. FIG. 6 shows changes in the amount of produced gases versus the light radiation period. It was ascertained that the amount of produced gases linearly increased as the time elapsed, and that the target reaction progressed without deterioration (auto-oxidation) of the semiconductor layer 2. In particular, the amount of produced hydrogen after 20 hours was 26.0 µL/cm², and the amount of produced oxygen after 20 hours was 12.5 µL/cm².

Example 2

In Example 2, the thickness of the insulation layer 4 in Example 1 was set at about 5 nm. The other parameters were the same as those in Example 1.

Example 3

In Example 3, the line width of the lattice pattern of the insulation layer 4 in Example 1 was set at about 100 µm, and the inter-adjacent-line interval of the lattice pattern in Example 1 was set at about 200 µm. That is, the distance between the oxidation catalyst layers 3 and the reduction catalyst layers 5, the size of one edge of the oxidation catalyst layers 3, and the size of one edge of the reduction catalyst layers 5 were each set at about 100 µm. The other parameters were the same as those in Example 1.

Example 4

In Example 4, the thickness of each of the Ti and Pt films layered on each other by using sputtering in the third step in Example 1 was set at about 6 nm, and the total thickness (thickness of reduction catalyst layers 5) after the heat treatment was set at about 10 nm. The other parameters were the same as those in Example 1.

Example 5

In Example 5, a Ni film having a thickness of about 2.5 nm was formed by using vacuum vapor deposition in the fourth step in Example 1, and the thickness of a NiO film (thickness of oxidation catalyst layers 3) formed by oxidizing the Ni film in the subsequent heat treatment was set at about 5 nm. The other parameters were the same as those in Example 1.

Comparative Example 1

In Comparative Example 1, the thickness of the insulation layer 4 in Example 1 was set at about 1 nm. The other parameters were the same as those in Example 1.

Comparative Example 2

In Comparative Example 2, the thickness of the insulation layer 4 in Example 1 was set at about 200 nm. The other parameters were the same as those in Example 1.

Comparative Example 3

In Comparative Example 3, the line width of the lattice pattern of the insulation layer 4 in Example 1 was set at about 200 µm, and the inter-adjacent-line interval of the lattice pattern in Example 1 was set at about 400 µm. That is, the distance between the oxidation catalyst layers 3 and the reduction catalyst layers 5, the size of one edge of the oxidation catalyst layers 3, and the size of one edge of the reduction catalyst layers 5 were each set at about 200 µm. The other parameters were the same as those in Example 1.

Comparative Example 4

In Comparative Example 4, the line width of the lattice pattern of the insulation layer 4 in Example 1 was set at about 300 µm, and the inter-adjacent-line interval of the lattice pattern in Example 1 was set at about 600 µm. That is, the distance between the oxidation catalyst layers 3 and the reduction catalyst layers 5, the size of one edge of the oxidation catalyst layers 3, and the size of one edge of the reduction catalyst layers 5 were each set at about 500 µm. The other parameters were the same as those in Example 1.

Comparative Example 5

In Comparative Example 5, the thicknesses of the Ti and Pt films layered on each other by using sputtering in the third step in Example 1 were set at about 2 nm and 3 nm, respectively, and the total thickness (thickness of reduction catalyst layers 5) after the heat treatment was set at about 4 nm. The other parameters were the same as those in Example 1.

Comparative Example 6

In Comparative Example 6, a Ni film having a thickness of about 5 nm was formed by using vacuum vapor deposition in the fourth step in Example 1, and the thickness of a NiO film (thickness of oxidation catalyst layers 3) formed by oxidizing the Ni film in the subsequent heat treatment was set at about 10 nm. The other parameters were the same as those in Example 1.

Comparative Example 7

Figure 7:
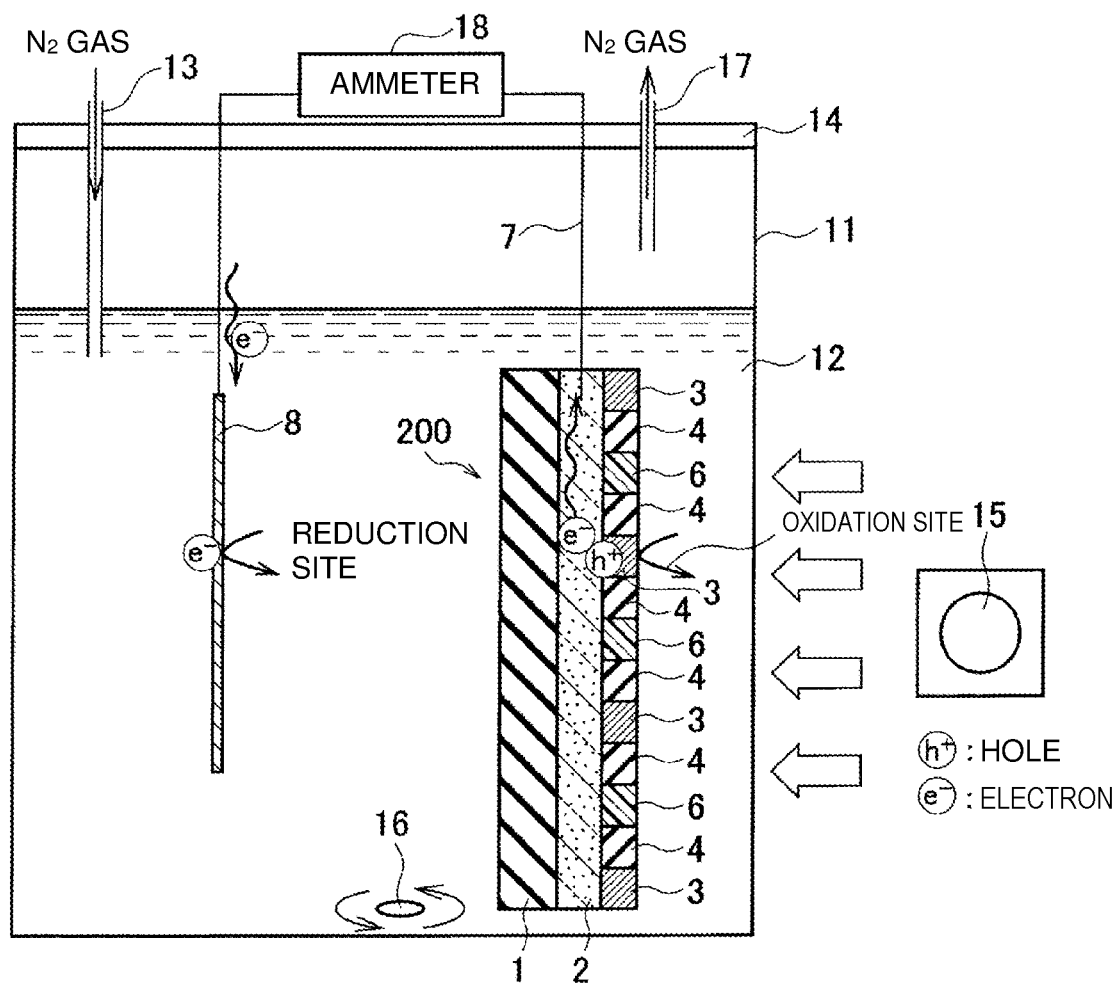
FIG. 7 is a schematic diagram showing the configuration of the redox reaction test cell according to Comparative Example 7.

FIG. 7 is a diagrammatic view showing the configuration of the redox reaction test cell according to Comparative Example 7. The reduction reaction site and the water oxidation reaction site are provided as a metal cathode plate 8 and the semiconductor photoelectrode 200, which serves as the anode plate and carries the oxidation catalyst layers 3 and the insulation layers 4 on one surface of the semiconductor layer 2, respectively, with the two plates being separated from each other, and the test is carried out based on a photoelectrochemical reaction using electrical connection that causes electrons to flow from a semiconductor photoelectrode 100' of the anode plate to the cathode plate 8.

Method for Producing Semiconductor Photoelectrode that is Anode

The semiconductor layer 2 made of n-GaN on which AlGaN was grown was produced in the same procedure as in Example 1. The lattice-shaped insulation layer 4 made of SiO₂ was formed on the upper surface of the semiconductor layer 2 by using vacuum vapor deposition in the same procedure as in Example 1. The oxidation catalyst layers 3 made of NiO was then formed in part of the region where no insulation layer 4 was formed. The reduction catalyst layers 5 were not formed, and the remainder of the no-layerformation region of the insulation layer 4, the region where no oxidation catalyst layer 3 was formed, was coated with an epoxy resin 6.

The thus created semiconductor photoelectrode 200 was cut into an electrode having a size of 10 mm×25 mm, and part of the surface was peeled off with a diamond scriber to expose the underlying n-GaN in the semiconductor layer 2. Indium was bonded with a soldering iron to the portion where n-GaN was exposed, and a conductor wire 7 was joined to the indium. The surface made of indium was coated with an epoxy resin so as not to be exposed, and the light receiving surface of the semiconductor photoelectrode 200 was set at a size of 10 mm×20 mm. The semiconductor photoelectrode 200 used as the anode was thus produced.

Redox Reaction Test

A redox reaction test was conducted by using the produced semiconductor photoelectrode 200.

An aqueous solution having a volume of 120 mL and containing 1 M (mole) of NaOH was placed in the light-transmissive reaction cell 11 having a capacity of 250 mL, the semiconductor photoelectrode 200 produced in accordance with the procedure described above was completely immersed in the aqueous solution 12, a Pt wire (manufactured by BAS, model number 002222) 8 was immersed as a counter electrode (cathode plate) in the aqueous solution 12, and the conductor wire 7 from the semiconductor photoelectrode 200 was connected to the Pt wire 8 via an ammeter 18. A nitrogen gas was introduced via the gas inlet 13 at the flow rate of 200 mL/min, bubbling was performed for 30 minutes for degassing and replacement, and then flow at a flow rate of 5 mL/min took place. The light source 15 for the redox reaction was the same as in Example 1 and was uniformly radiated from outside of the quartz window of the reaction cell 11 toward the entire surface where the semiconductor layer 2 of the semiconductor photoelectrode 200 was formed. The aqueous solution 12 was agitated at the center of the bottom of the cell at the speed of 250 rpm by using the agitator 16, such as a rotor or a stirrer. As a result, during the light radiation, the gases in the reaction cell 11 were analyzed by introducing a gas chromatograph directly via the gas outlet 17 of the reaction cell 11.

Evaluation of Semiconductor Device

Tables 1 and 2 show the characteristics of the structure of the semiconductor device 100 according to Examples 1 to 5 and Comparative Examples 1 to 7 and the accumulated amount of produced hydrogen and oxygen 1 hour, 5 hours, and 20 hours after the light radiation.

TABLE 1

| | Thickness of insulator | Distance between oxidation catalyst and reduction catalyst (size of each edge of oxidation catalyst and reduction catalyst) | Thickness of reduction catalyst | Thickness of oxidation catalyst | Amount of produced hydrogen ($\mu L/cm^2$) | | | Amount of produced oxygen ($\mu L/cm^2$) | | |
|---|---|---|---|---|---|---|---|---|---|---|
| | (nm) | ($\mu m$) | (nm) | (nm) | 1 h | 5 h | 20 h | 1 h | 5 h | 20 h |
| Example 1 | 50 | 10 | 40 | 1.7 | 1.6 | 6.4 | 26.0 | 0.9 | 6.1 | 12.5 |
| Example 2 | 5 | 10 | 40 | 1.7 | 2.1 | 8.0 | 28.6 | 1.2 | 7.6 | 13.8 |
| Example 3 | 50 | 100 | 40 | 1.7 | 1.4 | 5.8 | 24.7 | 0.8 | 5.8 | 10.9 |
| Example 4 | 50 | 10 | 10 | 1.7 | 1.5 | 6.3 | 25.0 | 0.8 | 5.9 | 12.1 |
| Example 5 | 50 | 10 | 40 | 5 | 1.3 | 5.1 | 20.8 | 0.7 | 4.8 | 10.1 |
| Comparative Example 1 | 1 | 10 | 40 | 1.7 | 2.0 | 2.1 | 2.0 | 0.9 | 0.9 | 0.8 |
| Comparative Example 2 | 200 | 10 | 40 | 1.7 | 0.8 | 3.0 | 12.0 | 0.4 | 3.0 | 6.0 |
| Comparative Example 3 | 50 | 200 | 40 | 1.7 | 0.4 | 0.2 | 0.3 | 0.1 | 0.1 | 0.1 |
| Comparative Example 4 | 50 | 500 | 40 | 1.7 | 0.1 | 0.0 | 0.8 | 0.0 | 0.0 | 0.0 |
| Comparative Example 5 | 50 | 10 | 4 | 1.7 | 1.5 | 5.0 | 9.8 | 0.8 | 2.2 | 3.9 |
| Comparative Example 6 | 50 | 10 | 40 | 10 | 0.5 | 1.1 | 2.6 | 0.2 | 0.6 | 1.3 |

TABLE 2

| | Oxidation electrode | Reduction electrode | Amount of produced hydrogen ($\mu L/cm^2$) | | | Amount of produced oxygen ($\mu L/cm^2$) | | |
|---|---|---|---|---|---|---|---|---|
| | | | 1 h | 5 h | 20 h | 1 h | 5 h | 20 h |
| Comparative Example 7 (Related art) | NiO, $SiO_2$/AlGAn/n-GaN | Platinum wire | 3.0 | 5.6 | 21.0 | 1.3 | 1.9 | 2.0 |

Even when any of the semiconductor devices 100 according to Examples 1 to 5 was used, it was ascertained that hydrogen and oxygen were linearly produced until 20 hours elapsed after the start of the light radiation, and there is no significant difference in the amount of produced gases in Examples 1 to 5. After 20 hours, the accumulated amount of produced hydrogen is greater than or equal to 20 μm/cm², and the accumulated amount of produced oxygen is greater than or equal to 10 μm/cm² in all Examples. In contrast, the amount of produced gas in Comparative Examples 1 to 7 is smaller than that in Examples 1 to 5 after 20 hours for both hydrogen and oxygen. It was found from the results described above that the semiconductor devices 100 according to Examples 1 to 5 show high quantum efficiency in the photocatalytic reaction.

There is no linear increase over elapsed time in the amount of produced gas in Comparative Examples 1 to 7 for both hydrogen and oxygen. The finding suggests that the etching reaction (that is, deterioration reaction due to auto-oxidation) in the semiconductor layer 2 progresses in Comparative Example 1, in which the insulation layer 4 has a small thickness. Comparative Example 2, in which the insulation layer 4 has a large thickness, suggests that the light absorption performed by the semiconductor layer 2 below the insulation layer 4 was inhibited, so that the amounts of produced electrons and holes decreased and the amount of produced gases decreased accordingly.

The results of Examples 1 and 2 and Comparative Examples 1 and 2 therefore show that the semiconductor device 100 is believed to be satisfactory in terms of both efficiency and lifetime as long as the insulation layer 4 has a thickness ranging from about 5 nm to 50 nm. When the thickness is 200 nm, as in Comparative Example 2, the amount of produced gases was low, which is a conceivable factor that inhibits the transmission of the radiated light. The upper limit of the thickness of the insulation layer 4 varies depending on the material to be used, and a thickness that provides optical transmittance large enough not to inhibit the light absorption in the underlying semiconductor layer 2 can be applied.

The results of Examples 1 and 3 and Comparative Examples 3 and 4 show that the semiconductor device 100 is believed to be satisfactory in terms of both efficiency and lifetime as long as the distance between the oxidation catalyst layers 3 and the reduction catalyst layers 5 is smaller than or equal to about 100 μm. When the oxidation catalyst layers 3 and the reduction catalyst layers 5 are in contact with each other, the two layers form a short circuit. The lower limit of the distance between the oxidation catalyst layers 3 and the reduction catalyst layers 5 is therefore believed to be about a few tens of nanometers in consideration of a possible distance that does not cause the two layers to be in contact with each other during the processes in the production steps. When the distance between the oxidation catalyst layers 3 and the reduction catalyst layers 5 is set at a value greater than or equal to 200 μm, as in Comparative Examples 3 and 4, the amount of produced gases is low, suggesting that the electrons and holes produced by the light radiation in the semiconductor layer 2 were not efficiently separated from each other and recombined with each other.

The results of Examples 1 and 4 and Comparative Example 5 show that the semiconductor device 100 is believed to be satisfactory in terms of both efficiency and lifetime as long as the reduction catalyst layers 5 each have a thickness ranging from about 10 nm to 40 nm. Since a sufficiently continuous film is formed in the thickness range described above, it is believed that the semiconductor device 100 has a satisfactory lifetime, that the electrons generated in the underlying semiconductor layer 2 are movable to the surface of the reduction catalyst layers 5, and that the quantum efficiency of the photocatalytic reaction is satisfactory.

The results of Examples 1 and 5 and Comparative Example 6 show that the semiconductor device 100 is believed to be satisfactory in terms of both efficiency and lifetime as long as the oxidation catalyst layers 3 each have a thickness smaller than or equal to 5 nm. To prevent deterioration of the semiconductor layer 2, it is necessary for the semiconductor layer 2 to have a continuous film structure, and to prevent the semiconductor layer 2 from having an intermittent or island-shaped structure, the semiconductor layer 2 needs to have a thickness greater than or equal to 1 nm. On the other hand, when the thickness of the oxidation catalyst layers 3 is set at 10 nm, as in Comparative Example 6, it is believed that the optical transmittance decreases and the efficiency decreases accordingly.

Finally, it is ascertained from the results of Example 1 and Comparative Example 7 that the semiconductor device according to the present invention linearly produces hydrogen and oxygen gases after 20 hours shows, as compared with a reaction system using the semiconductor photoelectrode 200, and therefore has higher durability than that provided by related art. In Comparative Example 7, in which the semiconductor layer 2 was provided as the anode plate, the initial amount of produced gases after 1 hour is greater than that in Example 1 but smaller than that in Example 1 after 20 hours. A conceivable reason for this is that when the semiconductor layer 2 is provided as the anode plate, the light radiation facilitates electrification separation, while holes that cannot be fully consumed in the reaction accumulate in the semiconductor layer 2, resulting in auto-oxidation (deterioration) of the semiconductor layer 2.

The results described above show that the semiconductor device 100 according to the present invention is a device that exhibits high photocatalytic activity and can suppress the deterioration reaction of the semiconductor layer 2 based on the insulator formed between the oxidation catalyst and the reduction catalyst that the semiconductor surface is not exposed.

Effects

According to Examples 1 to 5, in which the oxidation catalyst layers 3, which collect holes, and the reduction catalyst layers 5, which collect electrons, are disposed on the same plane of the semiconductor layer 2, the electron-hole pairs photo-excited in the semiconductor layer 2 can be quickly spatially separated from each other, the holes can be moved to the oxidation reaction site, and the electrons can be moved to the reduction reaction site. For example, in an application in which a reaction produces hydrogen from water, high photocatalytic activity can be obtained because the reverse reaction that produces an intermediate or a product of the reaction is suppressed. Furthermore, according to Examples 1 to 5, in which the insulation layer 4 is formed between the oxidation catalyst layers 3 and the reduction catalyst layers 5 so that the surface of the semiconductor layer 2 is not exposed, the deterioration reaction in the semiconductor layer 2 can be suppressed.

REFERENCE SIGNS LIST

1 Substrate
2 Semiconductor layer
3 Oxidation catalyst layer
4 Insulation layer

5 Reduction catalyst layer
6 Epoxy resin
7 Conductor wire
8 Pt wire
11 Reaction cell
12 Aqueous solution
13 Gas inlet
14 Silicon Teflon septum
15 Light source
16 Agitator
17 Gas outlet
18 Ammeter
100 Semiconductor device
200 Semiconductor photoelectrode

The invention claimed is:

1. A semiconductor device comprising:
a semiconductor layer disposed on a surface of a substrate and causing an oxidation reaction and a reduction reaction when irradiated with light;
an oxidation catalyst layer that is disposed on part of a surface of the semiconductor layer, forms along with the semiconductor layer a Schottky junction, and oxidizes an oxidation target substance;
a reduction catalyst layer that is disposed on part of the surface of the semiconductor layer where the oxidation catalyst layer is not disposed so as to be separated from the oxidation catalyst layer, forms along with the semiconductor layer an ohmic junction, and reduces a reduction target substance; and
an insulation layer that is disposed on entirety of the surface of the semiconductor layer where none of the oxidation catalyst layer and the reduction catalyst layer is disposed so as to be in contact with the oxidation catalyst layer and the reduction catalyst layer, and transmits the light with which the semiconductor layer is irradiated,
wherein the insulation layer comprises an oxide is configured to cover portions of the semiconductor layer not covered by the oxidation catalyst layer and the reduction layer and is configured to suppress a deterioration reaction in the semiconductor layer without preventing the semiconductor layer from absorbing the light,
wherein the surface of the semiconductor layer is entirely coated with the oxidation catalyst layer, the reduction catalyst layer, and the insulation layer, and
wherein the reduction catalyst layer is a layer that is a laminate of a 25 nm platinum thin film that is layered on a 25 nm titanium thin film.

2. The semiconductor device according to claim 1,
wherein the insulation layer has a shape of a lattice in a plan view of the surface of the semiconductor layer, and
the oxidation catalyst layer and the reduction catalyst layer are formed on the surface of the semiconductor layer in a plurality of no-insulation-layer-formation regions formed by the lattice-shaped insulation layer with the no-insulation-layer-formation regions for the oxidation catalyst layers being different from the no-insulation-layer-formation regions for the reduction catalyst layers.

3. The semiconductor device according to claim 1,
wherein a bandgap of the insulation layer is wider than a bandgap of the semiconductor layer.

4. The semiconductor device according to claim 1,
wherein the semiconductor layer is a layer made of a nitride semiconductor, specifically, a layer made of an n-type gallium nitride or a layer that is a laminate of a plurality of nitride semiconductors having an n-type gallium nitride layer disposed on a side facing the substrate,
the oxidation catalyst layer is a layer made of a metal oxide.

5. The semiconductor device according to claim 2,
wherein a bandgap of the insulation layer is wider than a bandgap of the semiconductor layer.

6. The semiconductor device according to claim 2,
wherein the semiconductor layer is a layer made of a nitride semiconductor, specifically, a layer made of an n-type gallium nitride or a layer that is a laminate of a plurality of nitride semiconductors having an n-type gallium nitride layer disposed on a side facing the substrate,
the oxidation catalyst layer is a layer made of a metal oxide.

7. The semiconductor device according to claim 3,
wherein the semiconductor layer is a layer made of a nitride semiconductor, specifically, a layer made of an n-type gallium nitride or a layer that is a laminate of a plurality of nitride semiconductors having an n-type gallium nitride layer disposed on a side facing the substrate,
the oxidation catalyst layer is a layer made of a metal oxide.

* * * * *